United States Patent
Harada et al.

(10) Patent No.: US 6,413,675 B1
(45) Date of Patent: *Jul. 2, 2002

(54) MULTI LAYER ELECTROLYTE AND CELL USING THE SAME

(75) Inventors: Gaku Harada; Toshihiko Nishiyama; Masaki Fujiwara; Shinako Okada, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/353,384

(22) Filed: Jul. 15, 1999

(30) Foreign Application Priority Data

Jul. 23, 1998 (JP) .......................................... 10-208067

(51) Int. Cl.[7] .......................... H01M 10/40; H01M 4/62
(52) U.S. Cl. ...................... 429/300; 429/303; 429/306; 429/313; 429/314; 429/315; 429/317; 429/105; 429/213; 29/623.3
(58) Field of Search ................................. 429/105, 213, 429/300, 303, 306, 309, 313, 314, 315, 317; 29/623.3

(56) References Cited

U.S. PATENT DOCUMENTS

| | | | | |
|---|---|---|---|---|
| 4,803,138 A | * | 2/1989 | Kobayashi et al. | 429/213 X |
| 5,407,593 A | * | 4/1995 | Whang | |
| 5,426,005 A | * | 6/1995 | Eschbach | 429/309 |
| 5,496,659 A | * | 3/1996 | Zito | 429/105 |
| 5,753,388 A | * | 5/1998 | Koksbang et al. | 429/309 |
| 5,853,916 A | * | 12/1998 | Venugopal et al. | 429/303 |
| 5,925,483 A | * | 7/1999 | Kejha et al. | 429/303 |
| 5,985,486 A | * | 11/1999 | Giron | 429/304 X |

FOREIGN PATENT DOCUMENTS

| | | |
|---|---|---|
| JP | 5-5161374 | 12/1980 |
| JP | 2-249643 | 10/1990 |
| JP | 4-087258 | 3/1992 |
| JP | 5-151996 | 6/1993 |
| JP | 7-14608 | 1/1995 |
| JP | 7-134989 | 5/1995 |
| JP | 7-204233 | 9/1995 |
| JP | 7-320780 | 12/1995 |
| JP | 7-320781 | 12/1995 |
| JP | 8-167415 | 6/1996 |
| JP | 8-329983 | 12/1996 |
| JP | 9-330740 | 12/1997 |
| JP | 10-162841 | 6/1998 |

* cited by examiner

Primary Examiner—Stephen Kalafut
(74) Attorney, Agent, or Firm—Sughrue Mion, PLLC (57) ABSTRACT

A multi layer electrolyte and a secondary cell using the multi layer electrolyte. The multi layer electrolyte comprises a solid electrolyte and other electrolyte such as gel electrolyte and/or electrolytic solution layer laminated on the solid electrolyte. The secondary cell using the multi layer electrolyte includes at least a positive electrode, a negative electrode and the multi layer electrolyte which comprises: a solid electrolyte layer; and at least one electrolyte layers selected from a gel electrolyte layer and an electrolytic solution layer and laminated on the solid electrolyte layer. By this structure, it is possible to use active material dissoluble in electrolytic solution as electrode active material and to realize a cell which can be quickly charged and discharged and which has superior capacity appearance rate and superior charge-discharge cycle characteristics.

28 Claims, 5 Drawing Sheets

| | SOLID ELECTROLYTE | ELECTROLYTIC SOLUTION OR GEL ELECTROLYTE | CAPACITY | CYCLE CHARACTERISTIC |
|---|---|---|---|---|
| EMBODIMENT 1 | Nafion | 6M, PVSA AQUEOUS SOLUTION | 100 mAh/g | 10000 |
| EMBODIMENT 2 | Nafion | GEL ELECTROLYTE | 100 mAh/g | 15000 |
| EMBODIMENT 3 | Nafion | GEL ELECTROLYTE | 244 mAh/g | 15000 |
| COMPARATIVE EXAMPLE 1 | — | 6M, PVSA AQUEOUS SOLUTION | 10 mAh/g | 10 |
| COMPARATIVE EXAMPLE 2 | — | GEL ELECTROLYTE | 20 mAh/g | 100 |
| COMPARATIVE EXAMPLE 3 | Nafion | — | 15 mAh/g | 10000 |
| COMPARATIVE EXAMPLE 4 | — | GEL ELECTROLYTE | 14.7 mAh/g | 50 |

FIG. 6

MULTI LAYER ELECTROLYTE AND CELL USING THE SAME

FIELD OF THE INVENTION

The present invention relates generally to a multi layer electrolyte and a cell using the electrolyte, and more particularly to a multi layer electrolyte which is used in a secondary cell and which comprises a solid electrolyte and other electrolyte such as gel electrolyte and/or electrolytic solution layer laminated on the solid electrolyte.

BACKGROUND OF THE INVENTION

Conventionally, materials which are soluble in electrolytic solution were not used as active materials for a positive electrode or a negative electrode of a cell. The main reasons why such materials cannot be used as active materials are considered as shown in the following three items.

1. Electronic conductivity is not retainable between active material dissolved into electrolytic solution and a collector. Therefore, reactivity of active material deteriorates.

2. Concentration of active material near the collector is decreased because the active material dissolves into electrolytic solution. Therefore, quantity of active material contributing oxidation and reduction reaction is decreased, and thereby capacity appearance rate, that is, ratio of actual capacity to theoretical capacity estimated from the quantity of active material is lowered.

3. Due to the dissolution of active material into electrolytic solution, electrode swells and thereby delamination occurs between a collector and the electrode.

In order to avoid dissolution of active materials into electrolytic solution, conventional methods generally adopt polymerizing of active materials, crosslinking of active materials, change of electrolytic solution such as using other solvent or solid electrolyte, and so on. Prior arts teaching such methods will be described below.

Japanese patent laid-open publication No. 7-134989 discloses a secondary cell using nonaqueous electrolyte system which uses carbon material as a negative electrode, and the surface of the carbon material is coated with solid polymer electrolyte film. In this publication, it is described that, by using carbon material whose surface is coated with solid polymer electrolyte film as a negative electrode, when, at charging such secondary cell, lithium ions which are solvated in electrolytic solution approach negative electrode, the electrolytic solution is cut off by the solid polymer electrolyte film coated on the surface of the negative electrode. Thus, only lithium ions pass through the solid polymer electrolyte film, and are intercalated between graphite layers of carbon material of the negative electrode.

Also, solid polymer electrolyte lithium secondary cell having solid polymer electrolyte layer between a positive electrode and a negative electrode is disclosed in Japanese patent laid-open publication No. 7-240233. In the solid polymer electrolyte lithium secondary cell disclosed in this publication, the negative electrode includes carbon material, solid electrolyte and electrolytic solution, and the electrolytic solution includes ethylene carbonate. In this publication, it is described that, by using a combination of the carbon material, the solid electrolyte and the electrolytic solution including ethylene carbonate in the negative electrode, this cell can have both useful discharge capacity and fine charge-discharge cycle characteristic.

Further, Japanese patent laid-open publication No. 7-320780 discloses a solid electrolyte secondary cell having a positive electrode, a negative electrode in which lithium is used as active material, and an electrolyte. The electrolyte is a solid polymer electrolyte comprising a composite of electrolyte salt and polymer, or is a gel polymer electrolyte which is made by impregnating a electrolytic solution comprising electrolyte salt and aprotic solvent into polymer. In this case, the polymer may be polyamide, polyimidazole, polyimide, polyoxazole, polytetrafluoroethylene, polymelamineformamide, polycarbonate, or polypropylene.

Further, Japanese patent laid-open publication No. 7-320781 discloses a solid electrolyte secondary cell having a positive electrode, a negative electrode in which lithium is used as active material, and an electrolyte. The electrolyte is a solid polymer electrolyte comprising a composite of electrolyte salt and polymer, or is a gel polymer electrolyte which is made by impregnating a electrolytic solution comprising electrolyte salt and aprotic solvent into polymer. In this case, the polymer may be a vinyl copolymer such as vinyl chloride-vinyl acetate copolymer, vinyl chloride-methyl acrylate copolymer, vinyl acetate-acrylonitrile copolymer, vinyl chloride-acrylonitrile copolymer, styrene-acrylonitrile copolymer, styrene-vinyl acetate copolymer, styrene-methyl methacrylate copolymer, and the like.

In the above-mentioned two Japanese patent laid-open publications Nos. 7-320780 and 7-320781, it is described, with respect to these solid electrolyte secondary cells, that since a solid polymer electrolyte or gel polymer electrolyte used in these secondary cells is hard to react with a negative electrode and since an internal resistance of the secondary cells is hard to increase even after charge-discharge cycles are repeated, it is possible to obtain superior charge-discharge cycle characteristics.

Japanese patent laid-open publication No. 9-330740 discloses a electrochemical cell comprising two kinds of different electrodes, wherein, after a solution which becomes a material of solid polymer electrolyte is impregnated into an electrode, the solution which becomes a material of solid polymer electrolyte is cured by heat treatment to solidify an electrolyte portion, and wherein the electrochemical cell is composed by combining electrodes via the solid polymer electrolyte therebetween. In this publication, it is described that, by such structure of electrochemical cell, it becomes possible to fabricate a lithium secondary cell having low internal resistance and high energy density.

However, techniques of polymerization or gelation of active materials described in the above-mentioned prior art publications have the following problems.

A first problem resides in that polymerization of active material monomer is not easily performed and it is difficult to synthesize large quantity of polymer.

A second problem resides in that polymerized active material often includes many and various impurities such as catalyst, initiator, oxidizing agent and by-product of reaction used or produced when active material monomer is polymerized. It is difficult to remove these impurities by purification. These impurities deactivate active materials that should contribute to oxidation-reduction reaction, and therefore the capacity appearance rate of cell is deteriorated.

A third problem resides in that it is difficult to mix, at molecule level, active material which is insolubilized due to polymerization with conduction assisting agent added when forming an electrode, and therefore the capacity appearance rate is deteriorated.

A fourth problem resides in that, by polymerizing active material monomer, oxidation-reduction potential shifts toward low potential side at the positive electrode and toward high potential side at the negative electrode and, therefore, there occurs a decrease in electromotive force.

A fifth problem resides in that, when crosslinking of active material is performed, reactivity of active material in oxidation-reduction reaction is deteriorated due to the change of molecular structure of active material, and thereby the capacity appearance rate is decreased.

Also, the techniques of changing electrolyte, that is, using other solvent, using solid electrolyte, and the like, described in the above-mentioned prior art publications have the following problems.

First, changing electrolyte causes deterioration of activity of active material, thereby the capacity appearance rate deteriorates.

Second, when solid electrolyte is used to avoid dissolution of active material into electrolytic solution, an equivalent series resistance (ESR) of a cell becomes high due to low ionic conductivity of the solid electrolyte. Therefore, capacity of a cell is decreased and it becomes impossible to quickly charge and discharge the cell.

SUMMARY OF THE INVENTION

Therefore, it is an object of the present invention to provide a multi layer electrolyte and a cell using the multi layer electrolyte which can overcome the above-mentioned disadvantages of the prior arts.

It is another object of the present invention to provide a cell which uses active material dissoluble in electrolytic solution as an electrode active material, and to provide electrolyte used for realizing such cell.

It is still another object of the present invention to provide a cell which can be quickly charged and discharged, and to provide electrolyte used for realizing such cell.

It is still another object of the present invention to provide a cell which has superior capacity appearance rate and superior cycle characteristics, and to provide electrolyte used for realizing such cell.

According to an aspect of the present invention, there is provided a multi layer electrolyte which comprises: a solid electrolyte layer; and at least one electrolyte layers selected from a gel electrolyte layer and an electrolytic solution layer and laminated on the solid electrolyte layer.

According to another aspect of the present invention, there is provided a cell including at least a positive electrode, a negative electrode and electrolyte. The electrolyte is a multi layer electrolyte which comprises: a solid electrolyte layer; and at least one electrolyte layers selected from a gel electrolyte layer and an electrolytic solution layer and laminated on the solid electrolyte layer.

According to still another aspect of the present invention, there is provided a cell including at least a positive electrode, a negative electrode and an electrolyte. The at least one of the positive electrode and the negative electrode includes active material which is dissoluble in electrolytic solution. The electrolyte is disposed between the positive electrode and the negative electrode and comprises a first electrolyte portion which includes solid electrolyte but which does not include gel electrolyte and electrolytic solution and a second electrolyte portion which includes gel electrolyte or electrolytic solution but which does not include solid electrolyte. The electrode or electrodes including active material which is dissoluble in electrolytic solution are adjacent the first electrolyte portion but are not adjacent the second electrolyte portion.

According to still another aspect of the present invention, there is provided a method for manufacturing a cell including at least a positive electrode, a negative electrode and multi layer electrolyte. The method comprises: preparing the positive electrode and the negative electrode, wherein at least one of the positive electrode and the negative electrode includes active material which is soluble in electrolytic solution electrolyte; forming a solid electrolyte layer on the at least one electrode including active material which is soluble in electrolytic solution; and opposing the positive electrode and the negative electrode via a separator including gel electrolyte or electrolytic solution so that the at least one of electrode including active material which is soluble in electrolytic solution opposes the separator including gel electrolyte or electrolytic solution via the solid electrolyte layer.

By using laminated or stacked electrolyte according to the present invention as electrolyte of a cell, it is possible to fabricate a cell which uses active material dissoluble in electrolytic solution. Such cell can be quickly charged and discharged. Also, such cell has high capacity and superior cycle characteristic, and can be quickly charged and discharged.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the attached drawings, preferred embodiments of the present invention will now be described.

[Embodiment 1]

Figure 1:
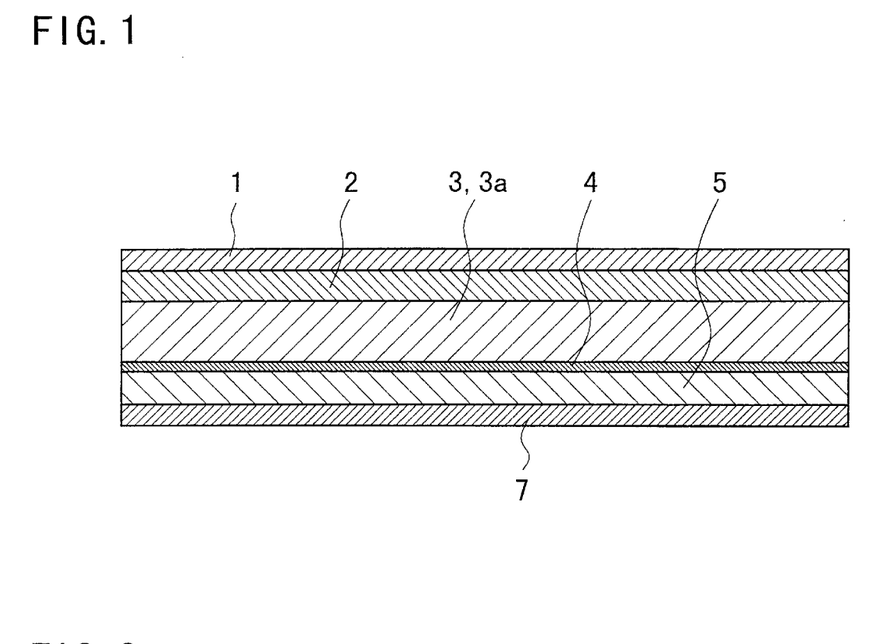
FIG. 1 is a schematic cross sectional view illustrating structures of cells according to first and second embodiments of the present invention.

With reference to FIG. 1, electrolyte according to this embodiment uses active material which is dissoluble in electrolytic solution as electrode active material of one or both of a negative electrode 5 and a positive electrode 2. On each electrode including active material which is dissoluble in electrolytic solution, solid electrolyte layer 4 is stacked or laminated, and on the solid electrolyte layer 4, a gel electrolyte layer 3a or a electrolytic solution layer 3 is stacked or laminated, thereby constituting a multi layer electrolyte. Active material which is dissoluble in electrolytic solution can be used as electrode materials of both negative and positive electrodes. Such embodiment will be described later.

As a solid electrolyte usable in a cell in which electrolytic solution of alkaline or acid aqueous solution system is usually used, various proton type ion exchange films such as polystyrenesulfonic acid and so on, or materials of polyoxyethylene system can be considered usable. In case ion exchange film is used, mainly, perfluorocarbonsulfonic acid (product name: Nafion®) is used as a solid polymer electrolyte (SPE). Here, examples of a cell which usually uses electrolytic solution of alkaline aqueous solution system are a nickel-cadmium cell or battery, a nickel-hydrogen cell or battery, and so on. Also, examples of a cell which usually uses electrolytic solution of acid aqueous solution system are a lead-acid cell or battery, and so on.

Also, as a solid electrolyte usable in a cell in which electrolytic solution of organic solvent system is usually used, for example, usable in a lithium-ion battery and so on, there are solid polymer electrolyte and so on of, for example, polyether system, i.e., polymer having ether linkage, polyester system, i.e., polymer having ester linkage, polyurethane system, i.e., polymer having urethane linkage, polyimide system, i.e., polymer having imide linkage, polysiloxane system, i.e., polymer having siloxane linkage, polyphosphazene system, i.e., polymer having phosphazen linkage, and the like.

Also, it is preferable that the above-mentioned polymer having ether linkage has backbone or skelton consisting of polyoxyethylene, that the polymer having ester linkage has polyethylene succinate, poly-β-propionlacton or the like, that the polymer having imide linkage is polyethyleneimine and so on, and that the polymer having siloxane linkage and the polymer having phosphazen linkage have polyether base.

In FIG. 1, the positive electrode 2 and the negative electrode 5 are opposingly disposed via a multi layer electrolyte in which the solid electrolyte layer 4, and electrolytic solution layer 3 or gel electrolyte layer 3a are laminated. Also, collectors 1 and 7 for extracting electric charges are provided at end surfaces of the positive electrode 2 and the negative electrode 5, respectively. By this structure, a cell is costituted.

Now, an explanation will be made on a method of manufacturing a cell according to this embodiment. Active materials used in this embodiment are shown in a formula (1) and a formula (2) below.

[Formula (1)]

[Formula (2)]

First, in order to fabricate the positive electrode 2, 8 weight percent (wt. %) of polyvinylidene fluoride having average molecular weight of 1100 as a binder resin was added to a mixture of polyaniline (formula 2) as an active material and vapor deposition carbon as a conductivity assisting agent (weight ratio=4:1), and thereby prepared a slurry.

After the slurry was stirred well by homogenizer, an electrode film 2 was formed from this slurry on a collector sheet 1 by using a doctor blade. Thereafter, the electrode film 2 was dried at 120 degrees Celsius for an hour. The thickness of the electrode film 2 was 100 micrometers. Then, the sheet on which the electrode film 2 was formed was cut into a predetermined shape, and thus the positive electrode 2 was fabricated.

Then, in order to fabricate the negative electrode 5, formic acid was added at room temperature to a mixture of polypyridine (formula 1) as an active material and vapor deposition carbon as a conductivity assisting agent (weight ratio=1:1), and thereby prepared a slurry. In this case, polypyridine functions also as binder. An electrode film 5 was formed from this slurry on a collector sheet 7 by using a doctor blade. The collector sheet 7 and the above-mentioned collector sheet 1 may be made of the same material, and also they may be made of different materials. Thereafter, the electrode film 5 was dried at 120 degrees Celsius for an hour. The thickness of the electrode film 5 was 100 micrometers. Then, the sheet on which the electrode film 5 was formed was cut into a predetermined shape, and thus the negative electrode 5 was fabricated. The solid electrolyte layer 4 was formed on the negative electrode 5 by applying Nafion® solution thereon. The applied Nafion® solution forms the solid electrolyte layer 4 on the negative electrode 5, and also impregnates into the negative electrode 5. Thereafter, the negative electrode 5 on which the solid electrolyte layer 4 is formed was dried at 40 degrees Celsius for 30 minutes. In place of applying the Nafion® solution, the negative electrode 5 can be dipped into and coated with the Nafion® solution to form the solid electrolyte layer 4. It is also possible to form the solid electrolyte layer 4 by vacuum impregnating the Nafion® solution into the negative electrode 5.

The positive electrode 2 and a separator 3 which comprises, for example, polypropylene and polyethylene and so on were vacuum impregnated with 6M, PVSA (polyvinylsulfonic acid) aqueous solution as electrolytic solution. Vacuum impregnation of the positive electrode 2 and the separator 3 can be performed by impregnating the positive electrode 2 and the separator 3 with PVSA solution at a reduced pressure of, for example, 30 Torr, and by further impregnating the positive electrode 2 and the separator 3 with PVSA solution while increasing the pressure to atmospheric pressure or a higher pressure, for example, 2 kg/cm².

Thereafter, the positive electrode 2 and the negative electrode 5 were opposed via the separator which was impregnated with the electrolytic solution, that is, the electrolytic solution layer 3. Thereby, a secondary cell in which the collector 7, the negative electrode 5, the solid electrolyte layer 4, the electrolytic solution layer 3, the positive electrode 2 and the collector 1 were laminated was obtained.

The completed secondary cell was charged by a constant current rate of 1 mA (1C) until 1V, and then discharged by a constant current rate of 1 mA (1C). In this case, a theoretical capacity was assumed to be 147 mAh/g (capacity per weight of active material of positive electrode), considering a limit at which polyaniline loses function as active material. As a result, when a voltage at discharge is 1.0 through 0.7V, capacity was 1.0 mAh, that is, capacity per weight of active material of positive electrode was 100 mAh/g. In this case, capacity appearance rate, i.e., a ratio of actual capacity to theoretical capacity, was 68 percent and was a high value. With respect to a charge-discharge cycle characteristic, number of charge-discharge cycles until the capacity decreases to 80 percent of an initial capacity was 10000 times. Also, delamination of electrodes did not occur during the charge-discharge cycles.

In the above-mentioned embodiment, polypyridine and polyaniline were used as active materials, and 6M, PVSA aqueous solution was used as electrolytic solution. However, materials of active materials and of electrolytic solution are not limited to those mentioned above. It is possible to use polymeric or macromolecular materials, low molecular materials, inorganic materials, or metallic materials as active materials, and to use acid aqueous solutions, alkaline aqueous solutions, organic solvents, and so on as electrolytic solutions. It is also possible to constitute the electrolytic solution layer 3 by a plurality of electrolytic solution layers. Also, the electrolytic solution layer 3 may be a gel electrolyte layer, or may be any combination of electrolytic solution layer or layers and electrolyte layer or layers. In this embodiment, polyvinylidene fluoride was used as the binder resin. However, material of the binder resin is not limited to such material unless it is not corroded by the electrolytic solution. Here, the solid electrolyte is an electrolyte which does not include molecule of solvent at all. Also, the electrolytic solution is a liquid state material obtained by dissolving the electrolyte, which does not have electronic conductivity and which has ionic conductivity, by a solvent such as water, organic solvent and the like. The gel electrolyte is an electrolyte which is obtained by plasticizing the solid electrolyte by using electrolytic solution or solvent and which includes solvent.

The active material which is dissoluble in electrolytic solution is intended to include not only the active material which is dissoluble in electrolytic solution but also the active material which is dissoluble in gel electrolyte and so on. Therefore, according to the present invention, it is possible to use the active material which is dissoluble in electrolytic solution and the active material which is dissoluble in gel electrolyte as active material of a cell and thereby to greatly improve performance of a cell.

Now, description will be made on the function and so on of the cell according to the embodiment mentioned above.

Oxidation-reduction reaction of polypyridine (Ppy: formula (1)) as the active material of the negative electrode is proton reaction. Therefore, it is supposed that if solution having high acidity is used as electrolytic solution, the oxidation-reduction reaction is promoted and capacity of the cell is increased, because protonated polypyridine contributing the oxidation-reduction reaction increases. However, in acid aqueous solution, the Ppy dissolves as it is protonated. Thus, if the Ppy is used as active material of the negative electrode, the capacity appearance rate and the cycle characteristic are deteriorated.

In this embodiment, the Ppy or electrode including the Ppy is coated by the solid electrolyte (Nafion®) which by itself has characteristic of proton transportability and it becomes possible to avoid contact between the Ppy and the acid aqueous solution. Thereby, it is possible to refrain the Ppy which is an active material from dissolving into aqueous solution of polyvinylsulfonic acid. Because the Ppy does not dissolve into the aqueous solution of polyvinylsulfonic acid and remains on the collector, it is possible to retain electron conductivity between the collector and the Ppy. Therefore, capacity appearance rate and cycle characteristic of a cell can be improved.

When only the solid electrolyte is used as the electrolyte of a cell, since high ionic conductivity is not retainable, ESR (equivalent series resistance) becomes high and it becomes impossible to quickly charge and discharge the cell. In order to solve this problem, in the present invention, a part of the solid electrolyte layer is replaced by a electrolytic solution layer or a gel electrolyte layer, that is, a portion which is adjacent the electrode including the Ppy is constituted by the solid electrolyte and other portion is constituted by the electrolytic solution or the gel electrolyte. Thereby, high ionic conductivity of electrolyte can be obtained, and quick charge and discharge operation becomes possible like a cell which does not use solid electrolyte.

[Embodiment 2]

Now, explanation will be made on a cell according to an embodiment 2 of the present invention. The cell according to this embodiment has the same structure as that shown in FIG. 1, except that the electrolyte layer 3 of the cell according to the embodiment 1 is replaced by an electrolyte layer 3a which is formed of gel electrolyte.

Embodiment 2 intends to avoid drying up of electrolyte by using the gel electrolyte, and thereby the cell according to this embodiment shows further improved cycle characteristics.

A method of fabricating the cell according to this embodiment will now be described.

A positive electrode 2, a negative electrode 5 and a solid electrolyte layer 4 were fabricated similarly to those of the cell according to the first embodiment. As the gel electrolyte layer 3a, polyoxyethylene gel was used. In order to fabricate the gel electrolyte layer 3a, a mixture was prepared in which polyoxyethylene monomer and 6M, polyvinylsulfonic acid were mixed in the weight ratio of 1:3. To this mixture, 4,4'-Azobis (4-cyanopentanoic acid) was added by 1 percent of monomer weight, as initiator. The solution thus fabricated was impregnated into the positive electrode 2 and the separator, i.e., the gel electrolye layer 3a. Then, the positive electrode 2, the separator 3a and the negative electrode 5 were laminated in this order, and polymerized at 80 degrees Celsius for 10 minutes. Thereby, a secondary cell was obtained in which a collector 7, the negative electrode 5, the solid electrolyte layer 4, the gel electrolyte layer 3a, the positive electrode 2 and other collector 1 are laminated.

The completed secondary cell was charged by a constant current rate of 1 mA (1C) until 1V, and then discharged by a constant current rate of 1 mA (1C). In this case, a theoretical capacity was assumed to be 147 mAh/g (capacity per weight of active material of positive electrode), considering a limit at which polyaniline loses function as active material. As a result, when a voltage at discharge is 1.0 through 0.7V, capacity was 1.0 mAh, that is, capacity per weight of active material of positive electrode was 100 mAh/g. In this case, capacity appearance rate, i.e., a ratio of actual capacity to theoretical capacity, was 68 percent and was a high value. With respect to a charge-discharge cycle characteristic, number of charge-discharge cycles until the capacity decreases to 80 percent of an initial capacity was 15000 times. Also, delamination of electrodes did not occur during the charge-discharge cycles.

In the above-mentioned embodiment, polypyridine and polyaniline were used as active materials, and 6M, PVSA aqueous solution was used as electrolytic solution. However, materials of active materials and of electrolytic solution are not limited to those mentioned above. It is possible to use polymeric or macromolecular materials, low molecular materials, inorganic materials, or metallic materials as active materials, and to use acid aqueous solutions, alkaline aqueous solutions, organic solvents, and so on as electrolytic solutions. It is also possible to constitute the gel electrolyte layer 3a by a plurality of gel electrolyte layers. Also, the gel electrolyte layer 3a may be electrolytic solution layer, or may be any combination of gel electrolyte layer or layers and electrolytic solution layer or layers. In this embodiment, polyvinylidene fluoride was used as the binder resin. However, material of the binder resin is not limited to such material unless it is not corroded by the electrolytic solution.

[Embodiment 3]

Now, explanation will be made on a cell according to an embodiment 3 of the present invention. The cell according to this embodiment has a structure shown in FIG. 2, in which, as active material of a positive electrode 2, benzoquinone which is a low molecular organic material and which is shown by formula (3) below is used.

Figure 2:
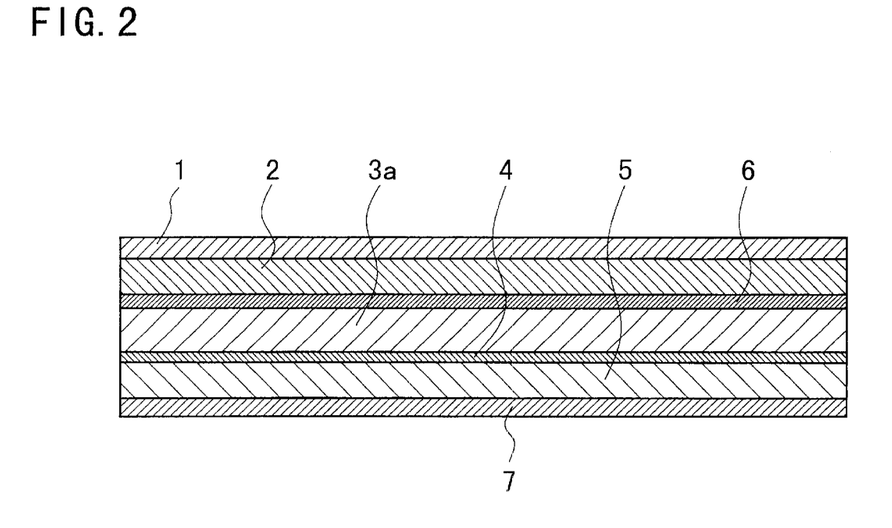
FIG. 2 is a schematic cross sectional view illustrating a structure of a cell according to a third embodiment of the present invention.

[Formula 3]

According to this embodiment, it becomes possible to easily use low molecular active material, such as benzoquinone, which is dissoluble in electrolytic solution, for example, PVSA solution, as electrode material of a cell without polymerizing it.

An explanation will be made on a method of manufacturing a cell according to this embodiment.

First, in order to fabricate the positive electrode 2, 8 weight percent (wt. %) of polyvinylidene fluoride having average molecular weight of 1100 as a binder resin was added to a mixture of benzoquinone (formula 3) as an active material and vapor deposition carbon as a conductivity assisting agent (weight ratio=4:1), and thereby prepared a slurry.

After the slurry was stirred well by homogenizer, an electrode film 2 was formed from this slurry on a collector sheet 1 by using a doctor blade. Thereafter, the electrode film 2 was dried at 120 degrees Celsius for an hour. The thickness of the electrode film 2 was 100 micrometers. Then, the solid electrolyte layer 6 was formed by applying the Nafion® on the electrode film 2. Thereafter, the solid electrolyte layer 6 was dried at 40 degrees Celsius for 30 minutes. Then, the sheet on which the electrode film 2 and the solid electrolyte layer 6 were formed was cut into a predetermined shape, and thus the positive electrode 2 was fabricated.

A negative electrode 5, a solid electrolyte layer 4 and a gel electrolyte layer 3a were fabricated similarly to those of the cell according to the embodiment 2. Thereby, a secondary cell was obtained in which a collector 7, the negative electrode 5, the solid electrolyte layer 4, the gel electrolyte layer 3a, the solid electrolyte layer 6, the positive electrode 2 and other collector 1 are laminated.

The completed secondary cell was charged by a constant current rate of 2.4 mA (1C) until 1V, and then discharged by a constant current rate of 2.4 mA (1C). In this case, a theoretical capacity was assumed to be 348 mAh/g (capacity per weight of active material of negative electrode), considering a limit at which polypyridine loses function as active material. As a result, when a voltage at discharge is 1.0 through 0.7V, capacity was 2.5 mAh, that is, capacity per weight of active material of negative electrode was 244 mAh/g. In this case, capacity appearance rate, i.e., a ratio of actual capacity to theoretical capacity, was 70 percent and was a very high value. With respect to a charge-discharge cycle characteristic, number of charge-discharge cycles until the capacity decreases to 80 percent of an initial capacity was 15000 times. Also, delamination of electrodes did not occur during the charge-discharge cycles.

In the above-mentioned embodiment, polypyridine and benzoquinone were used as active materials, and 6M, PVSA aqueous solution was used as electrolytic solution. However, materials of active materials and of electrolytic solution are not limited to those mentioned above. It is possible to use polymeric or macromolecular materials, low molecular materials, inorganic materials, or metallic materials as active materials, and to use acid aqueous solutions, alkaline aqueous solutions, organic solvents, and so on as electrolytic solutions. It is also possible to constitute the gel electrolyte layer 3a by a plurality of gel electrolytic solution layers. Also, the gel electrolyte layer 3a may be a electrolytic solution layer, or may be any combination of gel electrolyte layer or layers and electrolytic solution layer or layers. In this embodiment, polyvinylidene fluoride was used as the binder resin. However, material of the binder resin is not limited to such material unless it is not corroded by the electrolytic solution.

COMPARATIVE EXAMPLE 1

Figure 3:
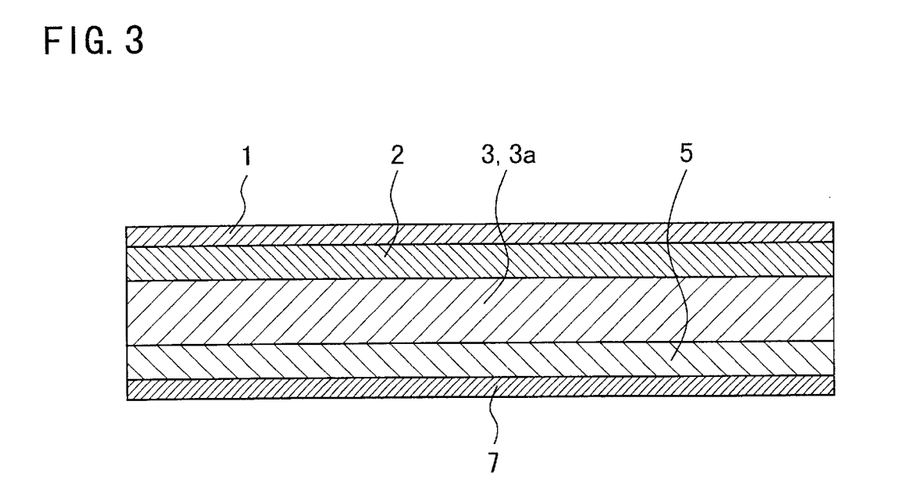
FIG. 3 is a schematic cross sectional view illustrating structures of cells according to first, second and fourth comparative examples.

With reference to the drawing, explanation will be made on a cell according to a comparative example 1 in detail. As shown in FIG. 3, the cell according to the comparative example 1 has a structure similar to the cell according to the embodiment 1 described before, except that the solid electrolyte layer 4 of the embodiment 1 is omitted, and only electrolytic solution is used as electrolyte.

Now explanation will be made on a method for fabricating the cell of the comparative example 1.

A positive electrode 2 and a negative electrode 5 were fabricated similarly to those of the cell according to the first embodiment. On the negative electrode 5, solid electrolyte layer was not formed. 6M, PVSA aqueous solution as electrolytic solution was vacuum impregnated into the positive electrode 2, the negative electrode 5 and the separator 3. Then, the positive electrode 2 and the negative electrode 5 were opposed via the separator 3. Thereby, a secondary cell was obtained in which a collector 7, the negative electrode 5, the electrolytic solution layer 4, the positive electrode 2 and other collector 1 are laminated.

The completed polymer secondary cell was charged by a constant current rate of 1 mA (1C) until 1V, and then discharged by a constant current rate of 1 mA (1C). As a result, when a voltage at discharge is 1.0 through 0.7V, capacity was 0.1 mAh, that is, capacity per weight of active material of positive electrode was 10 mAh/g. In this case, capacity appearance rate was 6.8 percent. With respect to a charge-discharge cycle characteristic, number of charge-discharge cycles until the capacity decreases to 80 percent of an initial capacity was 10 times.

COMPARATIVE EXAMPLE 2

With reference to the drawing, an explanation will be made of a cell according to comparative example 2 in detail. As shown in FIG. 3, the cell according to comparative example 2 has a structure similar to the cell according to embodiment 2 described before, except that the solid electrolyte layer 4 of embodiment 2 is omitted, and only a gel electrolyte is used as an electrolyte.

Now an explanation will be made of a method for fabricating the cell of comparative example 2.

A positive electrode 2 and a negative electrode 5 were fabricated similarly to those of the cell according to the embodiment 1 or 2. On the negative electrode 5, solid electrolyte layer was not formed. Gel electrolyte layer 3a was fabricated similarly to that of the embodiment 2. Thereby, a secondary cell was obtained in which a collector 7, the negative electrode 5, the gel electrolyte layer 3a, the positive electrode 2 and other collector 1 are laminated.

The completed polymer secondary cell was charged by a constant current rate of 1 mA (1C) until 1V, and then discharged by a constant current rate of 1 mA (1C). As a result, when a voltage at discharge is 1.0 through 0.7V, capacity was 0.2 mAh, that is, capacity per weight of active material of positive electrode was 20 mAh/g. In this case, capacity appearance rate was 13.6 percent. With respect to a charge-discharge cycle characteristic, number of charge-discharge cycles until the capacity decreases to 80 percent of an initial capacity was 20 times.

COMPARATIVE EXAMPLE 3

Figure 4:
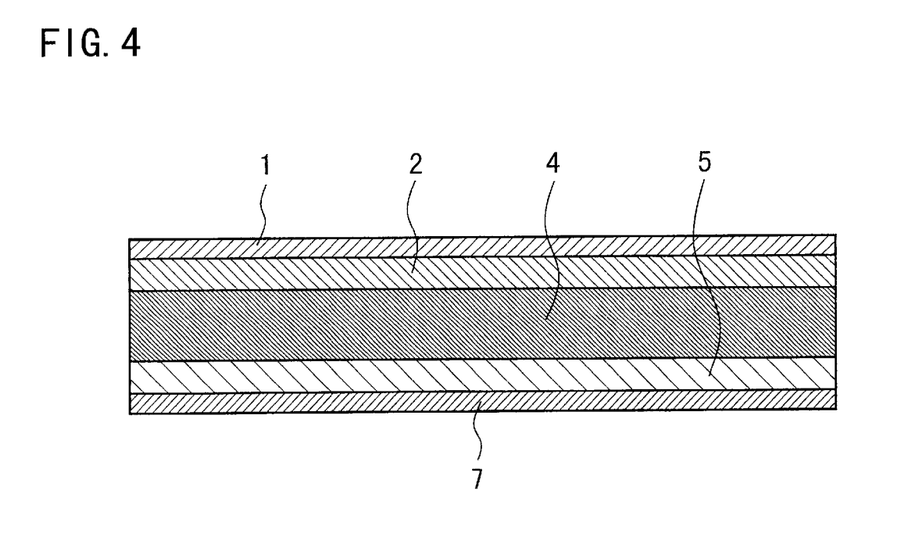
FIG. 4 is is a schematic cross sectional view illustrating a structure of a cell according to a third comparative example.

With reference to the drawing, explanation will be made on a cell according to a comparative example 3 in detail. As shown in FIG. 4, the cell according to the comparative example 3 has a structure similar to the cell according to the embodiment 1 described before, except that the electrolytic solution layer 3 of the embodiment 1 is omitted, and only solid electrolyte is used as electrolyte.

Now explanation will be made on a method for fabricating the cell of the comparative example 3.

A positive electrode 2, a negative electrode 5 and the solid electrolyte layer 4 were fabricated similarly to those of the cell according to the embodiment 1. Electrolytic solution layer and gel electrolyte layer were not formed. The positive electrode 2, the solid electrolyte layer 4 and the negative electrode 5 were laminated in this order, and dried at 40 degrees Celsius. Thereby, a secondary cell was obtained in which a collector 7, the negative electrode 5, the solid electrolyte layer 4, the positive electrode 2 and other collector 1 are laminated.

ESR of the polymer secondary cell fabricated as mentioned above was high and it was impossible to charge and discharge at 1 mA (1C). Therefore, the cell was charged by a constant current rate of 0.1 mA (0.1C) until 1V, and then discharged by a constant current rate of 0.1 mA (0.1C). As a result, when a voltage at discharge is 1.0 through 0.7V, capacity was 0.15 mAh, that is, capacity per weight of active material of positive electrode was 15 mAh/g. In this case, capacity appearance rate was 10.2 percent. With respect to a charge-discharge cycle characteristic, number of charge-discharge cycles until the capacity decreases to 80 percent of an initial capacity was 10000 times.

COMPARATIVE EXAMPLE 4

With reference to the drawing, explanation will be made on a cell according to a comparative example 4 in detail. As shown in FIG. 4, the cell according to the comparative example 4 has a structure similar to the cell according to the embodiment 3 described before, except that the solid electrolyte layers 4 and 6 of the embodiment 3 is omitted, and only gel electrolyte is used as electrolyte.

Now explanation will be made on a method for fabricating the cell of the comparative example 4.

A positive electrode 2 and a negative electrode 5 were fabricated similarly to those of the cell according to the embodiment 3. On positive electrode 2 and the negative electrode 5, solid electrolyte layers were not formed. 6M, PVSA aqueous solution as electrolytic solution was vacuum impregnated into the positive electrode 2, the negative electrode 5 and the separator 3a. Then, the positive electrode 2 and the negative electrode 5 were opposed via the separator 3a. Thereby, a secondary cell was obtained in which a collector 7, the negative electrode 5, the gel electrolyte layer 3a, the positive electrode 2 and other collector 1 are laminated.

The completed polymer secondary cell was charged by a constant current rate of 2.4 mA (1C) until 1V, and then discharged by a constant current rate of 2.4 mA (1C). As a result, when a voltage at discharge is 1.0 through 0.7V, capacity was 0.1 mAh, that is, capacity per weight of active material of negative electrode was 14.7 mAh/g. In this case, capacity appearance rate was 4.2 percent. With respect to a charge-discharge cycle characteristic, number of charge-discharge cycles until the capacity decreases to 80 percent of an initial capacity was 50 times.

Figure 5:
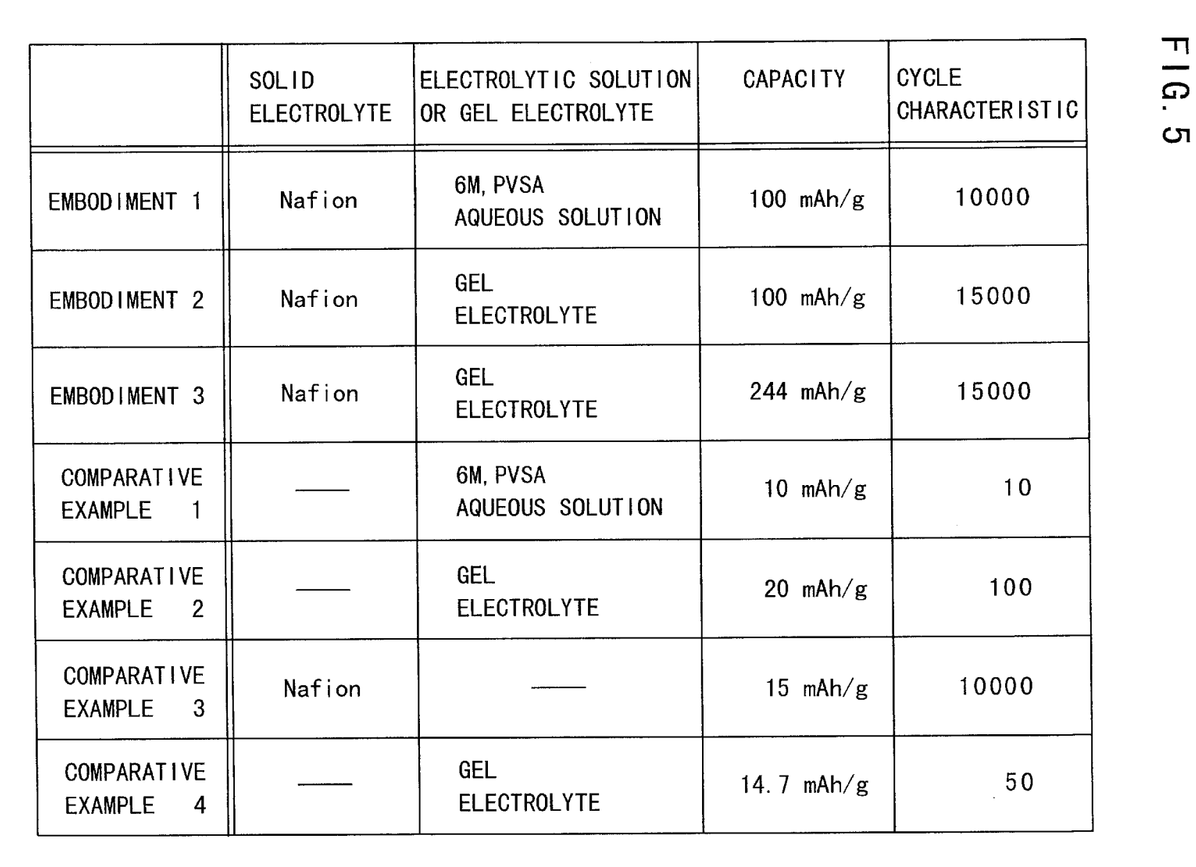
FIG. 5 is a table showing summary data of the cells according to the first through third embodiments and first through fourth comparative examples.
Figure 6:
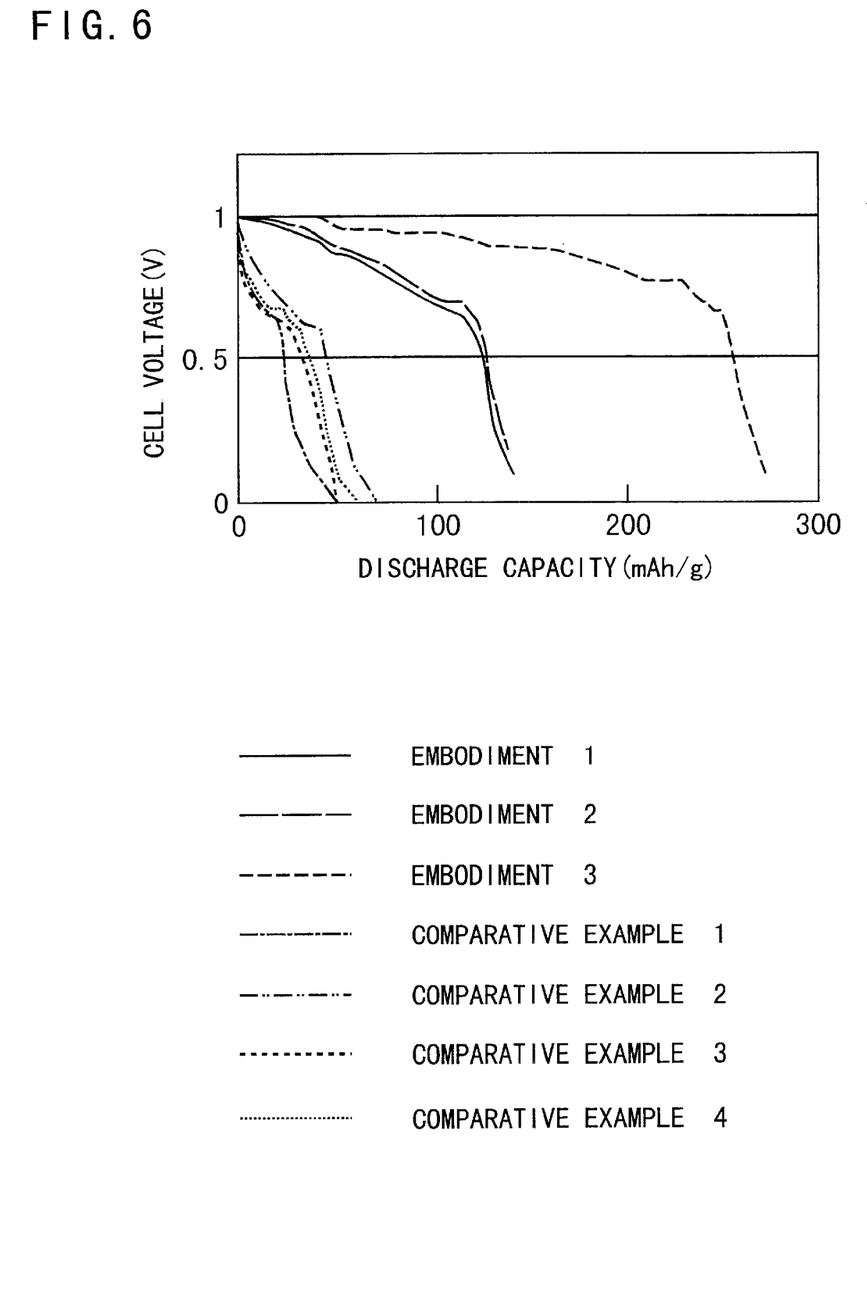
FIG. 6 is a graph showing discharge characteristics of the cells according to the present invention and according to the comparative examples.
Figure 7:
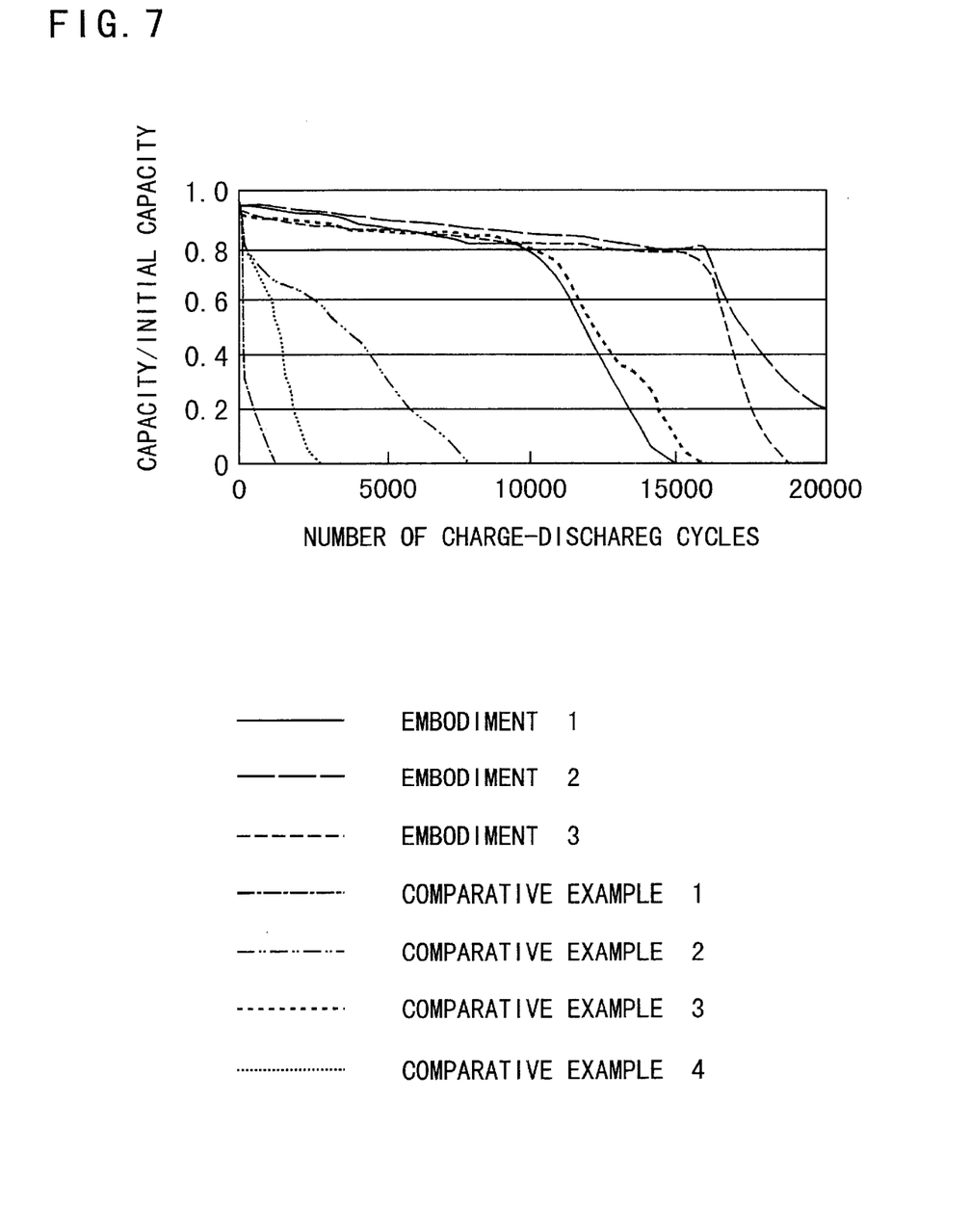
FIG. 7 is a graph showing charge-discharge cycle characteristics of the cells according to the present invention and according to the comparative examples.

Various results and data on the cells described above are summarized in a table shown in FIG. 5 and in graphs of FIGS. 6 and 7.

According to the present invention, it is possoble to fabricate a cell which uses active materials dissoluble in electrolytic solution. This is because, according to the present invention, a solid electrolyte layer is formed on an electrode which includes active material dissoluble in electrolytic solution, and thereby contact between active material and electrolytic solution can be avoided, so that dissolution of active material into electrolytic solution can be avoided. Thereby, it is possible to use active material dissoluble in electrolytic solution in a cell, and it becomes possible to realize a cell or battery having large capacity and having superior cycle characteristics.

Another advantage is that quick charge and discharge of a cell can be realized according to the present invention. This is because, in the present invention, electrolyte is not constituted by using only solid electrolyte, but a part of the solid electrolyte is replaced by electrolytic solution or gel electrolyte having high ionic conductivity. That is, among electrolyte, a portion adjacent electrode including active material dissoluble in electrolytic solution is formed by the solid electrolyte, and other portion is formed by the electrolytic solution or gel electrolyte. Therefore, it is possible to retain high ionic conductivity of the electrolyte, and thus quick charge and discharge operation can be realized similarly to a cell which does not use solid electrolyte.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A cell including at least a positive electrode, a negative electrode and an electrolyte, wherein said electrolyte is a multilayer electrolyte comprising:

first and second solid electrolyte layers disposed at the outermost sides of said electrolyte such that said first and second solid electrolyte layers are disposed contiguously to said positive electrode and said negative electrode; and at least one electrolyte layer disposed between said first and second solid electrolyte layers, wherein the at least one electrolyte layer is selected from the group consisting of a gel electrolyte layer and an electrolytic solution layer.

2. The cell as set forth in claim 1, wherein at least one of said first and second solid electrolyte layers includes perfluorocarbonsulfonic acid.

3. The cell as set forth in claim 1, wherein at least one of said first and second solid electrolyte layers includes solid polymer electrolyte comprising a polymer having ether linkage, a polymer having ester linkage, a polymer having urethane linkage, a polymer having imide linkage, a polymer having siloxane linkage, or a polymer having phosphazene linkage.

4. The cell as set forth in claim 3, wherein said polymer having ether linkage has a polyoxyethylene backbone.

5. The cell as set forth in claim 3, wherein said polymer having ester linkage has a polyethylene succinate or a poly-β-propionlactone.

6. The cell as set forth in claim 3, wherein said polymer having imide linkage is a polyethyleneimine.

7. The cell as set forth in claim 3, wherein said polymer having siloxane linkage has a polyether group.

8. The cell as set forth in claim 3, wherein said polymer having phosphazene linkage has a polyether group.

9. A cell including at least a positive electrode, a negative electrode and an electrolyte, wherein said electrolyte is a multilayer electrolyte comprising:

a solid electrolyte layer; and at least one electrolyte layer selected from the group consisting of a gel electrolyte layer and an electrolytic solution layer and laminated on said solid electrolyte layer, wherein at least one of said positive electrode and negative electrode includes active material which is dissoluble in electrolytic solution, and electrode or electrodes including active material which is dissoluble in electrolytic solution are adjacent said solid electrolyte layer but are not adjacent said gel electrolyte layer or said electrolytic solution layer.

10. The cell as set forth in claim 9, wherein each of said positive electrode and said negative electrode includes active material which is dissoluble in electrolytic solution, and wherein said multilayer electrolyte comprises:

a first solid electrolyte layer contiguous to said positive electrode;

at least one electrolyte layer laminated on said first solid electrolyte layer and selected from the group consisting of a gel electrolyte layer and an electrolytic solution layer; and a second solid electrolyte layer laminated on said at least one electrolyte layer and contiguous to said negative electrode.

11. A cell as set forth in claim 9, wherein said electrode or electrodes including said active material which is dissoluble in electrolytic solution include solid electrolyte material and do not include gel electrolyte and electrolytic solution.

12. A cell as set forth in claim 9, wherein said positive electrode is prepared by using polyaniline as an active material, vapor deposition carbon as a conductivity assisting agent and polyvinylidene fluoride as a binder resin.

13. A cell as set forth in claim 9, wherein said positive electrode is prepared by using benzoquinone as an active material, vapor deposition carbon as a conductivity assisting agent and polyvinylidene fluoride as a binder resin.

14. A cell as set forth in claim 9, wherein said negative electrode is prepared by using polypyridine as an active material, vapor deposition carbon as a conductivity assisting agent and formic acid.

15. A cell as set forth in claim 9, wherein said positive electrode and said negative electrode are opposed via said multi layer electrolyte, and a collector is provided on each surface of said positive electrode and said negative electrode which do not contact said multi layer electrolyte.

16. A cell including at least a positive electrode, a negative electrode and an electrolyte, wherein:

at least one of said positive electrode and said negative electrode includes active material which is dissoluble in electrolytic solution;

said electrolyte is disposed between said positive electrode and said negative electrode and comprises a first electrolyte portion which includes solid electrolyte but which does not include gel electrolyte and electrolytic solution and a second electrolyte portion which includes gel electrolyte or electrolytic solution but which does not include solid electrolyte; and said electrode or electrodes including active material which is dissoluble in electrolytic solution are adjacent said first electrolyte portion but are not adjacent said second electrolyte portion.

17. A method for manufacturing a cell including at least a positive electrode, a negative electrode and a multi layer electrolyte, said method comprises:

preparing said positive electrode and said negative electrode, wherein at least one of said positive electrode and said negative electrode includes active material which is soluble in electrolytic solution;

forming a solid electrolyte layer on said at least one electrode including active material which is soluble in electrolytic solution; and opposing said positive electrode and said negative electrode via a separator including gel electrolyte or electrolytic solution so that said at least one of electrode including active material which is soluble in electrolytic solution opposes said separator including gel electrolyte or electrolytic solution via said solid electrolyte layer.

18. A method for manufacturing a cell as set forth in claim 17, wherein said preparing said positive electrode and said negative electrode includes: fabricating slurry for said positive electrode and slurry for said negative electrode respectively from active material, conductivity assisting agent and binder; fabricating a positive electrode film on a collector sheet by using said slurry for said positive electrode and fabricating a negative electrode film on a collector sheet by using said slurry for said negative electrode; and cutting said collector sheet on which said positive electrode film is formed and said collector sheet on which said negative electrode film is formed into predetermined respective forms.

19. A method for manufacturing a cell as set forth in claim 17, wherein said forming a solid electrolyte layer on said at least one electrode including active material which is soluble in electrolytic solution comprises: applying or impregnating perfluorocarbonsulfonic acid solution onto said electrode including active material which is soluble in electrolytic solution.

20. A method for manufacturing a cell as set forth in claim 17, wherein said opposing said positive electrode and said negative electrode via a separator including gel electrolyte or electrolytic solution comprises: impregnating said gel electrolyte or said electrolytic solution into said separator and opposing said positive electrode and said negative electrode via said separator into which said gel electrolyte or electrolytic solution is impregnated.

21. A multilayer electrolyte comprising:
   first and second solid electrolyte layers disposed at the outermost sides of said electrolyte; and
   at least one electrolyte layer disposed between said first and second solid electrolyte layers, wherein the at least one electrolyte layer is selected from the group consisting of a gel electrolyte layer and an electrolytic solution layer.

22. The multilayer electrolyte as set forth in claim 21, wherein at least one of said first and second solid electrolyte layers includes perfluorocarbonsulfonic acid.

23. The multilayer electrolyte as set forth in claim 21, wherein at least one of said first and second solid electrolyte layers includes solid polymer electrolyte comprising a polymer having ether linkage, a polymer having ester linkage, a polymer having urethane linkage, a polymer having imide linkage, a polymer having siloxane linkage, or a polymer having phosphazene linkage.

24. A multilayer electrolyte as set forth in claim 23, wherein said polymer having ether linkage has a polyoxyethylene backbone.

25. A multilayer electrolyte as set forth in claim 23, wherein said polymer having ester linkage has a polyethylene succinate or a poly-$\beta$-propionlactone.

26. A multilayer electrolyte as set forth in claim 23, wherein said polymer having imide linkage is a polyethyleneimine.

27. A multilayer electrolyte as set forth in claim 23, wherein said polymer having siloxane linkage has a polyether group.

28. A multilayer electrolyte as set forth in claim 23, wherein said polymer having phosphazene linkage has a polyether group.

* * * * *